(12) United States Patent
Blessent et al.

(10) Patent No.: US 7,236,512 B2
(45) Date of Patent: Jun. 26, 2007

(54) CODE CHANNEL ALLOCATIONS IN A WIRELESS COMMUNICATIONS SYSTEM

(75) Inventors: Luca Blessent, San Marcos, CA (US); Ashish N. Desai, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 733 days.

(21) Appl. No.: 10/645,697

(22) Filed: Aug. 20, 2003

(65) Prior Publication Data

US 2004/0109493 A1 Jun. 10, 2004

Related U.S. Application Data

(60) Provisional application No. 60/409,528, filed on Sep. 9, 2002.

(51) Int. Cl.
*H04B 1/69* (2006.01)
*H04B 1/707* (2006.01)
(52) U.S. Cl. .................................. 375/146; 370/209
(58) Field of Classification Search ................ 375/130, 375/140, 141, 146; 370/208, 209, 335, 342, 370/441; 455/422.1, 450, 464
See application file for complete search history.

(56) References Cited

U.S. PATENT DOCUMENTS 6,163,524 A * 12/2000 Magnusson et al. ........ 370/208
6,646,979 B1 * 11/2003 Chen et al. ................. 370/208
7,012,886 B2 * 3/2006 Meier et al. ................ 370/209
7,020,176 B2 * 3/2006 Heo .......................... 375/130
7,054,294 B2 * 5/2006 Magnusson ................ 370/335
2002/0176438 A1 * 11/2002 Karjalainen ................ 370/441

FOREIGN PATENT DOCUMENTS

WO 00/08789 2/2000

OTHER PUBLICATIONS

Ray-Guang Cheng et al., "OVSF Code Channel Assignment for IMT-2000," 2000 IEEE 51st Vehicular Technology Conference Proceedings, vol. 3 of 3, Tokyo, Japan, May 15, 2000, pp. 2188-2192.

* cited by examiner

*Primary Examiner*—Betsy L. Deppe
(74) *Attorney, Agent, or Firm*—Thomas Rouse; Charles D. Brown; Howard H. Seo

(57) ABSTRACT

Systems and techniques are disclosed relating to communications. The systems and techniques involve spread-spectrum communications using a scheduler, or similar component, configured to maintain a plurality of spreading sequence assignments and a plurality of available spreading sequences each being orthogonal to the assigned spreading sequences. The scheduler may also be configured to select a spreading sequence from a group of the available spreading sequences having the same length, the selected spreading sequence being generated from a block of codes and being selected based on the number of the available spreading sequences that can be generated using the same block of codes.

18 Claims, 8 Drawing Sheets

FIG. 3

CODE CHANNEL ALLOCATIONS IN A WIRELESS COMMUNICATIONS SYSTEM

CLAIM OF PRIORITY UNDER 35 U.S.C. §119

The present Application for Patent claims priority to Provisional Application No. 60/409,528 entitled "CODE CHANNEL ALLOCATIONS IN A WIRELESS COMMUNICATIONS SYSTEM" filed Sep. 9, 2002, and assigned to the assignee hereof and hereby expressly incorporated by reference herein.

BACKGROUND

1. Field

The present invention relates generally to communications, and more specifically, to systems and techniques for managing code channel assignments in a wireless communications system.

2. Background

Modern communications systems are designed to allow multiple users to share a common communications medium. One such communications system is a code division multiple access (CDMA) system. The CDMA communications system is a modulation and multiple access scheme based on spread-spectrum communications. In a CDMA communications system, a large number of signals share the same frequency spectrum and, as a result, provide an increase in user capacity. This is achieved by transmitting each signal with a different code that modulates a carrier, and thereby, spreads the signal over the entire spectrum. The transmitted signals may be separated in the receiver by a correlator using a corresponding code to de-spread the desired signal. The undesired signals, whose codes do not match, contribute only to noise.

In spread-spectrum communications, a base station controller (BSC) is often used to interface a wireless network to a communications infrastructure such as a wide area network (WAN) or a local area network (LAN). The wireless network includes multiple base stations each configured to serve all users within a geographic region known as a cell. In this configuration, orthogonal sequences known as Walsh codes may be used in the forward link to separate multiple users operating within the same cellular region. The forward link refers to signal transmissions from a base station to a user.

With the tremendous increase in wireless communications over the past years, there has been a demand for higher data rate services to support web browsing, video applications, and the like. Often the demand is met by using multiple forward channels to carry traffic from the base station to a user with each forward channel having a distinct Walsh code. Unfortunately, this approach tends to introduce additional complexities in the user equipment requiring multiple Walsh code demodulation.

An alternative method for providing high data rate services that avoids the complexities of demodulating multiple Walsh channels, involves the use of spreading sequences derived from one or more Walsh codes. However, once a Walsh code is used, it cannot be used again to generate a subsequent spreading sequence for lack of orthogonality. Accordingly, an efficient methodology or algorithm is needed for spreading sequence assignments to avoid the loss of Walsh codes needed to construct higher speed channels.

SUMMARY

In one aspect of the present invention, a spread-spectrum communications apparatus includes a scheduler configured to maintain a plurality of spreading sequence assignments and a plurality of available spreading sequences each being orthogonal to the assigned spreading sequences, the scheduler further being configured to select a spreading sequence from a group of the available spreading sequences having the same length, the selected spreading sequence being generated from a block of codes and being selected based on the number of the available spreading sequences that can be generated using the same block of codes.

In another aspect of the present invention, a spread-spectrum communications apparatus includes a scheduler configured to maintain a plurality of spreading sequence assignments and a plurality of available spreading sequences each being orthogonal to the assigned spreading sequences, the scheduler further being configured to identify an available spreading sequence having the shortest length among all available spreading sequences, determine a target length and compare it to the length of the identified spreading sequence, and select an available spreading sequence based on the comparison.

In yet another aspect of the present invention, a spread-spectrum communications apparatus includes means for maintaining a plurality of spreading sequence assignments and a plurality of available spreading sequences each being orthogonal to the assigned spreading sequences, and selection means for selecting a spreading sequence from a group of the available spreading sequences having the same length, the selected spreading sequence being generated from a block of codes and being selected based on the number of the available spreading sequences that can be generated using the same block of codes.

In a further aspect of the present invention, a method of spread-spectrum communications includes maintaining a plurality of spreading sequence assignments and a plurality of available spreading sequences each being orthogonal to the assigned spreading sequences, and selecting a spreading sequence from a group of the available spreading sequences having the same length, the selected spreading sequence being generated from a block of codes and being selected based on the number of the available spreading sequences that can be generated using the same block of codes.

It is understood that other embodiments of the present invention will become readily apparent to those skilled in the art from the following detailed description, wherein it is shown and described only exemplary embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein:

FIG. 3 is a table of a 64×64 Walsh code matrix;

DETAILED DESCRIPTION

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention.

Figure 1:
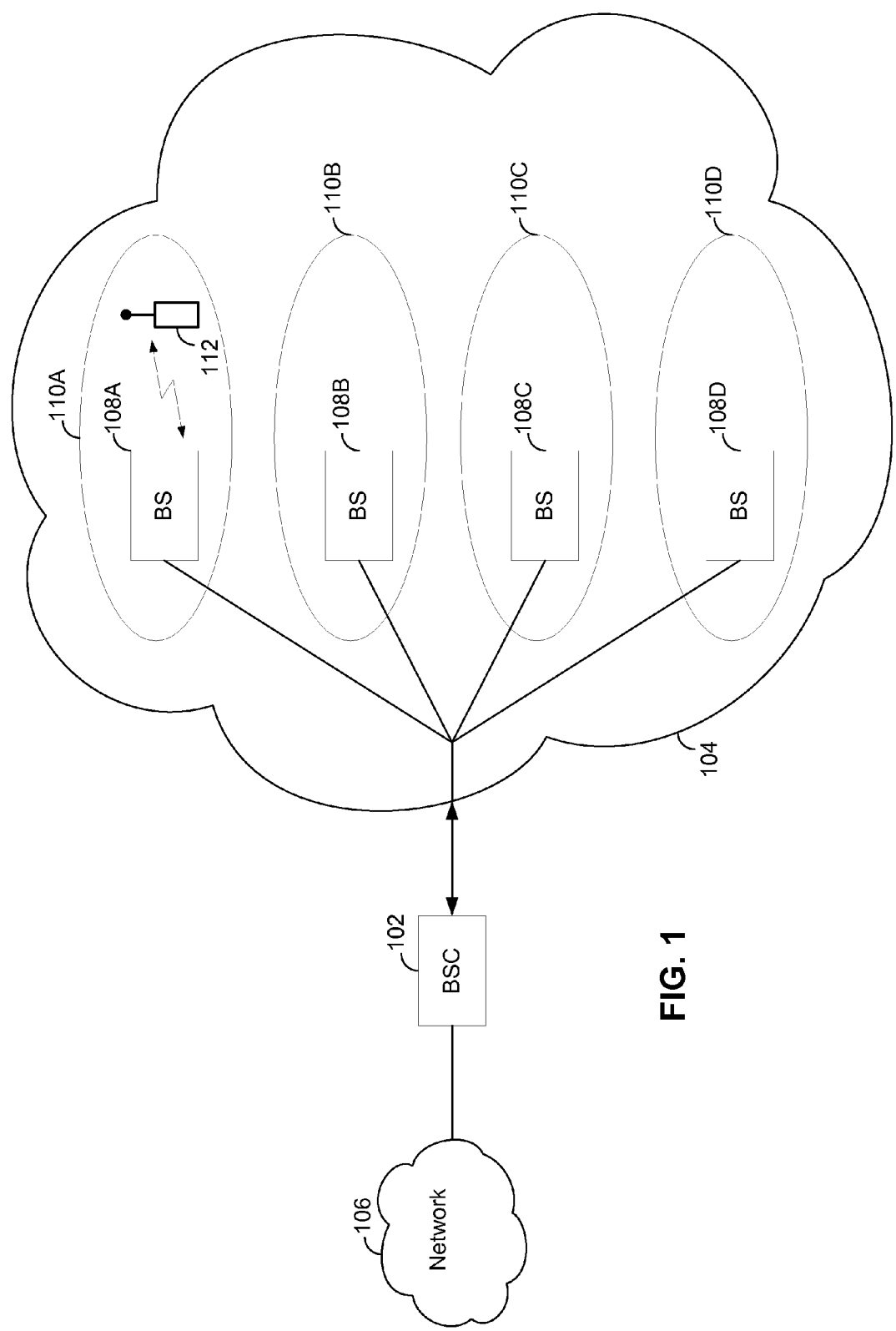
FIG. 1 is a conceptual block diagram of a CDMA communications system.

FIG. 1 is a conceptual block diagram of a CDMA communications system. A BSC 102 may be used to interface a wireless network 104 to a communications infrastructure 106 such as a wide area network (WAN) or a local area network (LAN). The wireless network includes multiple base stations 108A-D each assigned to a cellular region 110A-D. A subscriber station 112 may access the communications infrastructure 106, or communicate with other subscriber stations (not shown), through one or more base stations 108A-D under control of the BSC 102.

Figure 2:
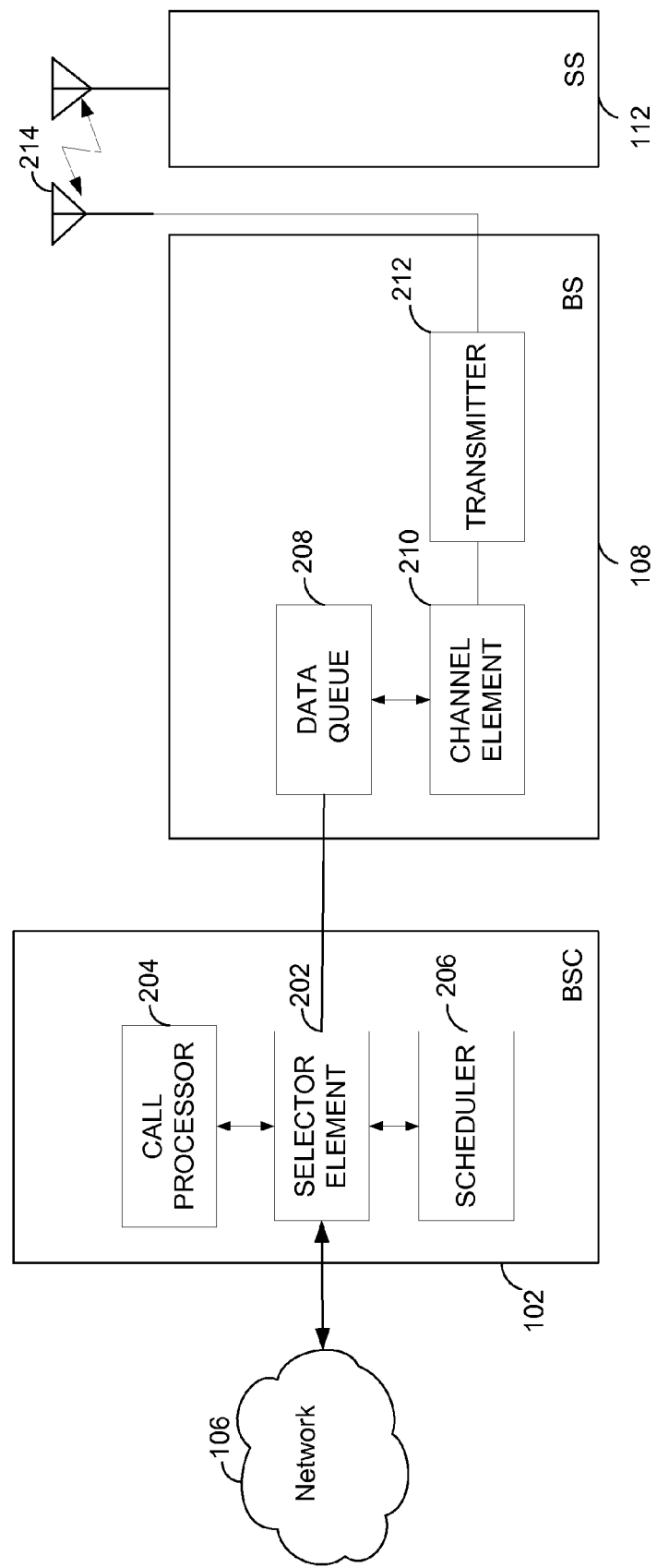
FIG. 2 is a simplified functional block diagram illustrating the basic subsystems of a CDMA communications system.

FIG. 2 is a simplified functional block diagram illustrating the basic subsystems of the exemplary CDMA communications system of FIG. 1. The BSC 102 includes many selector elements, although only one selector element 202 is shown for simplicity. One selector element is dedicated to communications with each subscriber station through one or more base stations. When a call is initiated, a call processor 204 may be used to establish a connection between the selector element 202 and the subscriber station 112. A scheduler 206 may then assign a Walsh code to the subscriber station 112 to identify forward link transmissions to the subscriber station 112 over that connection. Depending on the data requirements of the subscriber station 112, the scheduler may assign multiple Walsh codes to the subscriber station 112 to support high data rate services. Alternatively, the scheduler 206 may assign a spreading sequence derived from multiple Walsh codes to the subscriber station 112 in a manner to be described in greater detail later. For the purposes of this disclosure, the term "data" shall be construed broadly to include data, voice, video and/or any other type of information. "Walsh code assignment(s)" shall also be construed broadly to include one Walsh code assignment, multiple Walsh code assignments, and/or spreading sequences derived from multiple Walsh codes. The Walsh code assignment may be transmitted from the BSC 102 to the subscriber station 112 with the exchange of signaling messages during call set-up.

The selector element 202 may be configured to receive data from the communications infrastructure 106. The selector element 202 may then forward the data to each base station in communication with the intended subscriber station 112. The base station 108 may include a data queue 208, which buffers the data from the selector element 202 before transmission over the forward link to the subscriber station 112. The data from data queue 208 may be provided to a channel element 210. The channel element 210 may provide various signal processing functions such as convolutional encoding, scrambling with long pseudo-random noise (PN) codes, interleaving and modulation. The resulting modulated data may then be spread with the assigned Walsh code or spreading sequence, combined with overhead channels, and quadrature modulated with short PN codes. The short PN codes are a second layer of coding that is used to isolate one cellular region from another. This approach allows the re-use of Walsh codes in every cellular region. The output of the channel element 210 may be provided to a transmitter 212 for filtering, amplification and up conversion to a carrier frequency before transmission over the forward link from the base station 108 to the subscriber station 112 via an antenna 214.

The location of the scheduler 206 is dependent on whether a centralized or distributed scheduling function is desired. For example, a distributed scheduling scheme may utilize a scheduler in every base station. In this configuration, the scheduler for each base station determines the Walsh code assignments for the subscriber stations within its cellular region independently of the Walsh code assignments in other cellular regions. Conversely, a centralized scheduling scheme may utilize a single scheduler 206 in the BSC 102 to coordinate the Walsh code assignments for multiple base stations. In any event, the scheduler 206 is responsible for the Walsh code assignments in the forward link to support high data rate services as well as conventional voice services.

The scheduler 206 may be implemented in a variety of ways depending on the specific application and the overall design requirements. In one embodiment, Walsh code assignments may be determined from a call origination request from the subscriber station 112. When a user initiates a call, or launches an application that initiates a call, a call origination request may be generated by the subscriber station 112 identifying the type of service requested by the user and the quality of service required. For example, the call origination request may indicate that the user has initiated a video application requiring 64 k bits/second. In this embodiment, the call origination request may be transmitted from the subscriber station 112 to the base station 108 over a control channel and provided to the scheduler 206 in the BSC 102. A Walsh code assignment may then be made by the scheduler 206 based on the call origination request as well as other system constraints such as the quality of the forward link, the maximum transmit power available at the base station, the current Walsh channel assignments for other subscriber stations, and/or other related factors. The Walsh code assignment may be provided to the base station 108 where it may be transmitted to the subscriber station 112 over a paging channel.

The Walsh channel assignments may be made by the scheduler 206 using various algorithms. The algorithm may be optimized to provide Walsh channel assignments that minimize the possibility of restricting of high-speed channel assignments for subsequent subscriber stations. To illustrate this concept, the algorithm will be described in connection with a 64×64 Walsh code matrix. However, the inventive concepts described throughout this disclosure may be used with any size Walsh code matrix. Moreover, variations on this algorithm will be readily apparent to those skilled in the art for use with other spreading codes such as PN codes and the like.

Figure 3:
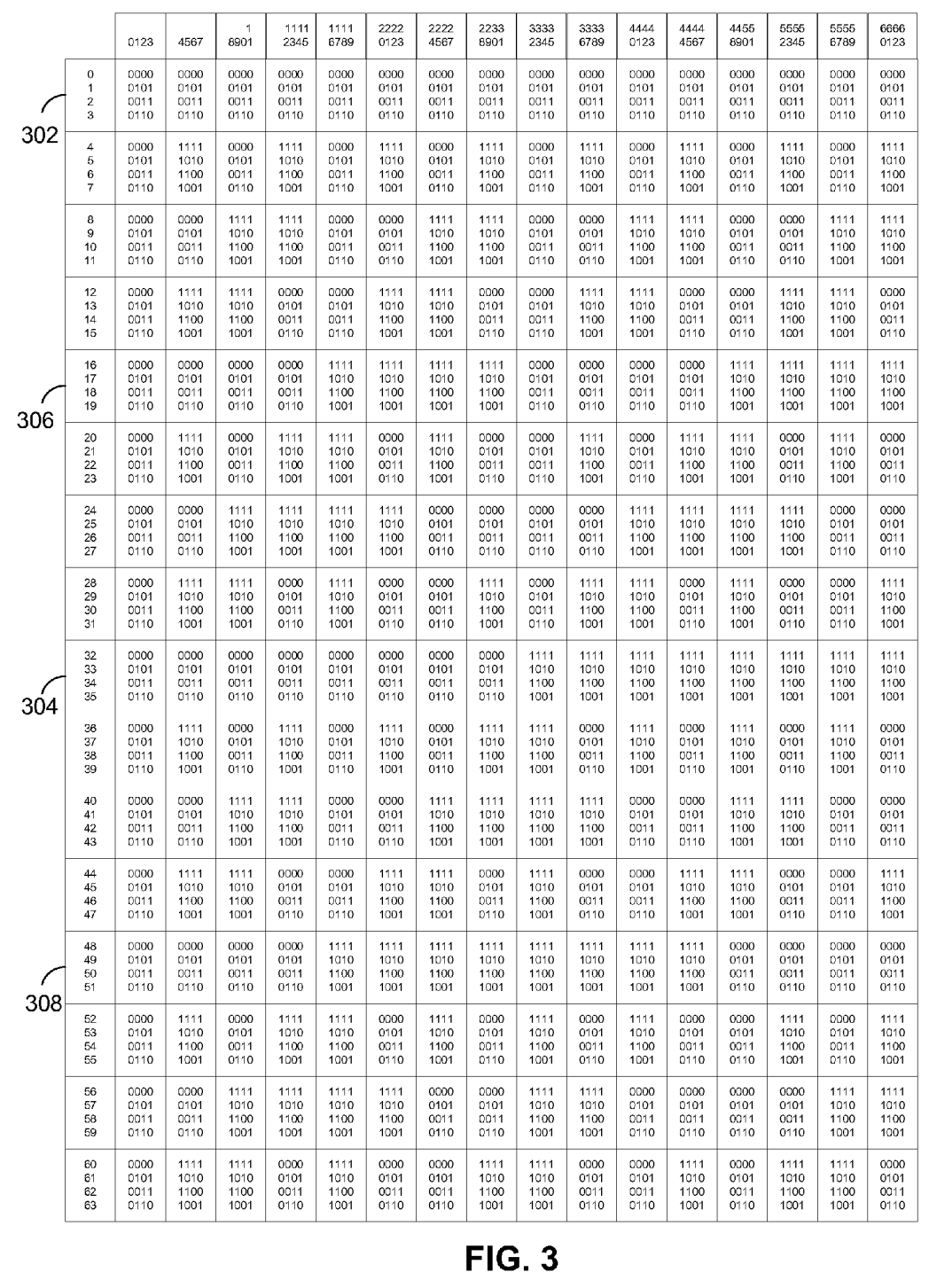

Referring to the 64×64 Walsh code matrix shown in FIG. 3, a scheduler may assign one of 64 possible different Walsh codes to a subscriber station. Once a Walsh code is assigned, it becomes unavailable for allocation to other subscriber stations within the same cellular region. Should a call origination request from a subscriber station require a high-speed channel, the scheduler may respond in various ways. The scheduler may assign two or more available Walsh codes to the subscriber station to carry the forward link data. Alternatively, the scheduler may derive a shortened spreading sequence from multiple Walsh codes. By assigning the shortened spreading sequence to the subscriber station, the Walsh codes used to derive this spreading sequence become unavailable. These Walsh codes are said to be "virtually" assigned because, although not technically assigned to a subscriber station, they have been removed from the realm of available Walsh channels. For example, a shortened spreading sequence comprising 32 zeros may be constructed by merging a 32 chip common sequence from two Walsh codes. As can be seen from FIG. 3, Walsh codes (W0) 302 and (W32) 304 each have a common chip sequence comprising 32 zeros as the most significant chips. Accordingly, a spreading sequence of 32 zeros results in a virtual assignment of Walsh code (W0) 302 and (W32) 304. The virtual assignment of Walsh codes (W0) and (W32) is needed to maintain orthogonality. Extending this concept to a shortened spreading sequence comprising 16 zeros results in the virtual assignment of Walsh codes (W0) 302, (W16) 306, (W32) 304, and (W48) 308.

Figure 4:
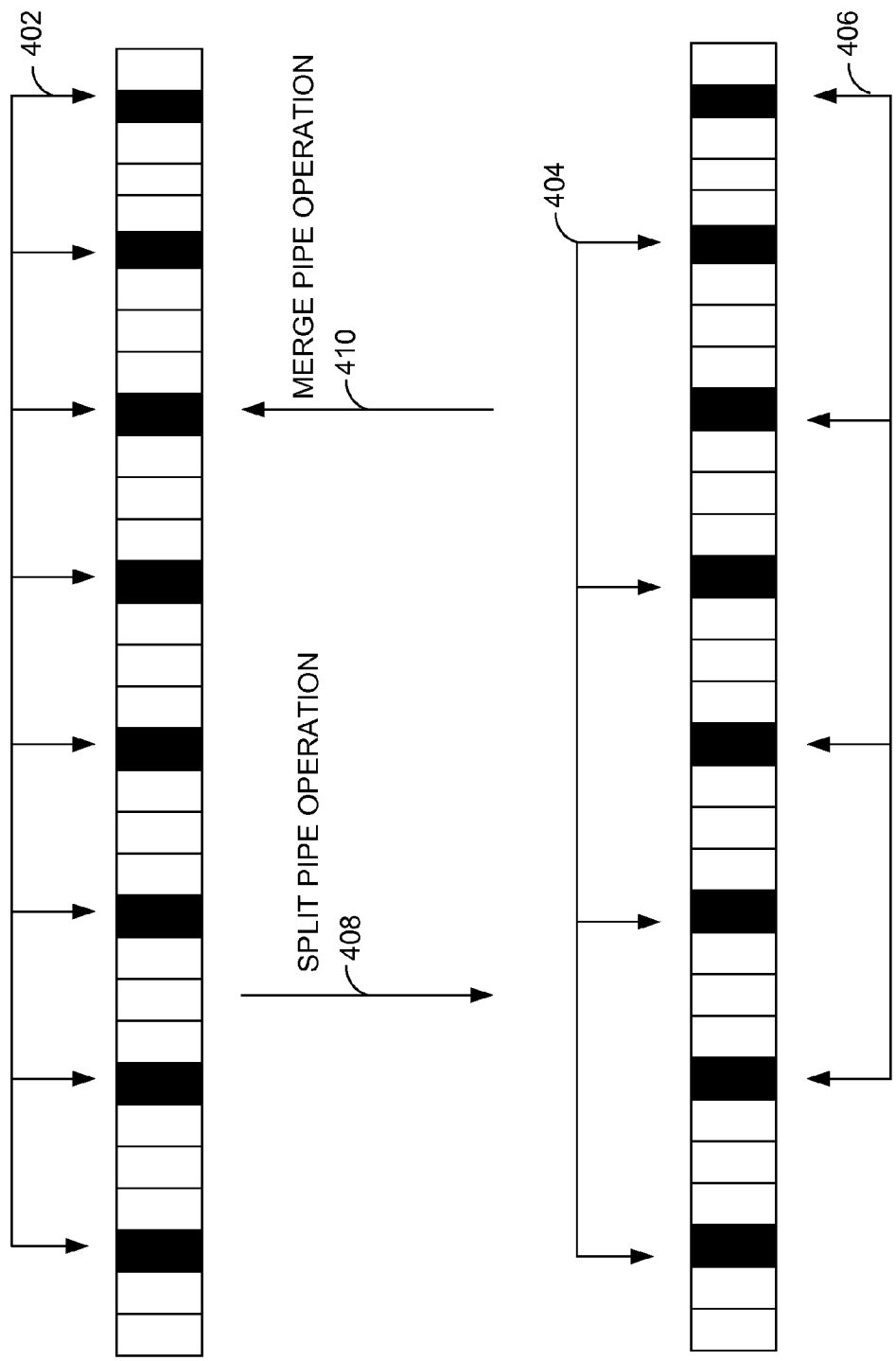
FIG. 4 is a conceptual diagram illustrating the composition of communication pipes with multiple Walsh codes.

FIG. 4 is an illustrative diagram representing a Walsh code space for a 32×32 Walsh code matrix. The concept of a communications pipe will be introduced to further illustrate the benefits and effects of using shortened spreading sequences derived from Walsh codes. A separate pipe is used to support forward link communications from the base station to each subscriber station. For voice and low speed data application, 32 pipes are available from a 32×32 Walsh code matrix. Each of the 32 pipes is constructed with a distinct Walsh code having 32 chips and is defined as a 1×-pipe. Higher capacity pipes may be constructed with shortened spreading sequences derived from multiple Walsh codes. For example, a shortened spreading sequence comprising 4-chips may be constructed from 8-Walsh codes as shown in FIG. 4. This high capacity pipe 402 is eight times faster (8×) than the 1×-pipe, but results in 8-Walsh codes being virtually assigned and unavailable for future allocation. The 8×-pipe 402 may be split into two 4×-pipes 404 and 406 using a split pipe operation 408. Each 4×-pipe 404 and 406 comprises a shortened spreading sequence comprising 8 chips and constructed from 4-Walsh codes with a Walsh code spacing of 32/4 or 8. Conversely, the two 4×-pipes 404 and 406 may be merged back into the 8×-pipe 402 using a merge pipe operation 410. However, if the 8×-pipe 402 is assigned to a subscriber station, then both 4×-pipes 404 and 406 are unavailable for future allocation to other subscriber stations. In a manner to be described in greater detail later, the split pipe operation and the merge pipe operation may be used to optimize Walsh code assignments to minimize the possibility of splitting available high capacity pipes. In general, a pipe having a spreading sequence derived from 2n Walsh codes may be split into two smaller pipes each having a spreading sequence derived from 2n−1 Walsh codes.

Figure 5:
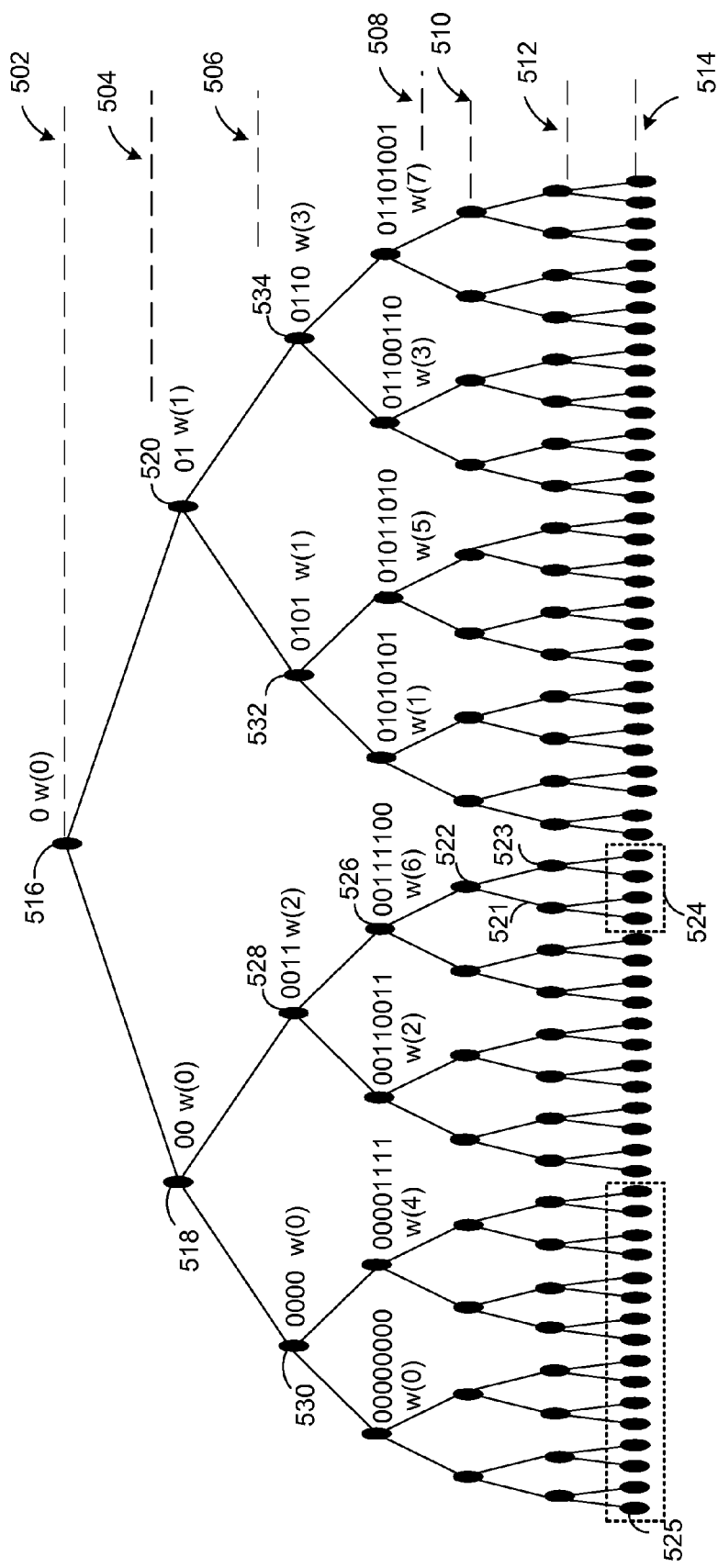
FIG. 5 is a conceptual diagram illustrating a hierarchical organization of the spreading sequences generated from Walsh codes.

To further explain the manner in which the pipes may be split and merged across the entire Walsh code space, it is useful to visualize the Walsh code space in a hierarchical organization using a tree structure as shown in FIG. 5. The tree structure includes 2n+1 nodes having n+1 levels. The variable n may be ascertained from the relationship: 2n=the Walsh code length. For example, in a 64×64 Walsh code matrix, the tree structure has 128 nodes with 7 levels. At the top, or root, level 502 there is a node 516 that represents one 64×-pipe having a 1-chip spreading sequence derived from all 64 Walsh codes. The 64×-pipe may be split into two smaller capacity 32×-pipes represented by two nodes 518, 520 at a second level 504. Each of the 32×-pipes at this level have a 2-chip spreading sequence derived from 32 Walsh codes. In like pattern, the third level 506 comprises four 16×-pipes each having a 4-chip spreading sequence derived from 16 Walsh codes; the fourth level 508 comprises eight 8×-pipes each having an 8-chip spreading sequence derived from 8 Walsh codes; the fifth level 510 comprises sixteen 4×-pipes each having a 16-chip spreading sequence derived from 4 Walsh codes, the sixth level 512 comprises 32 2×-pipes each having a 32-chip spreading sequence derived from 2 Walsh codes; and the seventh level 514 comprises 64 1×-pipes each having a 64-chip Walsh code.

The assignment of Walsh codes to the nodes may be performed using various conventions. One exemplary convention sets the node at the root level 502 to "0." Working downward through the levels of the tree structure, the most significant chip of each child node retains the same value as the parent node. The least significant chip of the left child node also retains the same value as the parent node, while the least significant chip of the right child node is assigned the inverse value of the parent node. For example, at level 502, the node 516 has a value of "0" and represents a 1-chip Walsh code having a value of "0." At the second level 504, the node 518 has a value of "00" and the node 520 has a value "01." A similar pattern may be repeated through the levels of the tree, with the final level having sixty-four nodes, each one having a distinct 64-chip Walsh code.

A Walsh code assignment to a subscriber station corresponds to the assignment of a node in the tree structure. An algorithm for Walsh code assignments can be implemented in accordance with certain procedures. First, when a node is assigned, the entire sub-tree rooted at that node is flagged as virtually assigned. Second, all parent nodes of the assigned node up to the root of the tree structure are also flagged as virtually assigned. The virtual assignment of these nodes is made to maintain orthogonality. The nodes are also unavailable for lack of orthogonal. Should the communications link with the subscriber station be terminated, the node can be released within the tree structure for future assignment. In addition, all the virtual assignments to the entire sub-tree rooted at that node and its parents up to the root of the tree structure can also be released.

The algorithm can then be used to select a node within the lowest level of the tree structure that supports the data rate requirements of the subscriber station. If all the nodes at that level are unavailable, the algorithm proceeds to the next lower level to locate a node that has not been previously assigned. This process continues until a node is selected or the algorithm determines that there are no available nodes. In the event that the algorithm identifies multiple nodes available at any level during the selection process, the nodes can be prioritized to prevent an arbitrary assignment, which could result in the inefficient removal of nodes and the splitting of high capacity pipes. Therefore, the exemplary algorithm can optimize node assignments by allocating nodes from more-densely populated sub-trees. That is, when searching for available nodes to assign within a level, available nodes are prioritized according to the assignment density of the sub-tree in which they reside. A sub-tree with a greater number of assigned parent nodes is a higher density sub-tree, and its available nodes will be given a higher priority than nodes on a less densely populated sub-tree. This prioritization based on assignment density helps to reduce the splitting of the high speed pipes by inefficient Walsh code assignments.

An example of this process is described with reference to FIG. 5, which shows 64 Walsh codes at level 514, and various spreading sequences that can be generated from the Walsh codes at levels above 512, 510, 508, 506, 504 and 502. First, if a subscriber station requires a 4×-pipe, a node at level 510 may be selected and assigned to that subscriber station. As explained above, the nodes at level 510 are generated from Walsh codes residing on the lowest level 514. For example, a node 522 is generated from a block of Walsh codes 524. If the node 522 is assigned to the subscriber station, the Walsh codes of block 524 are rendered unavailable, and therefore, should be flagged as virtual assigned. Also, any nodes that can be generated from one or more Walsh codes from block 524, either alone or in combination with other Walsh codes, are also rendered unavailable by the assignment of the node 522. Therefore, nodes 521, 523, 526, 528, 518 and 516, as well as all the Walsh codes in the block 524, should also be marked as virtual assigned.

Next, if a second subscriber station requests, for example, a 16×-pipe, a node at level 506 may be selected and assigned to the second subscriber station. A group of available nodes at level 506 should therefore be identified. Because the node 528 has been previously rendered unavailable by virtue of the fact that the spreading sequence represented by the node 528 may be generated from the block of Walsh codes 524, the only available nodes on level 506 will be nodes 530, 532 and 534. And, in fact, each of these nodes 530, 532 and 534 represents spreading sequences that cannot be generated from the block of Walsh codes 524.

After the group of available nodes is identified, one may be selected for assignment to the second subscriber station. Selecting from the highest density sub-tree avoids splitting high-speed pipes by inefficient Walsh code assignments. Applying this criterion, one can readily see that the node 530 should be selected to avoid fragmenting the 32×-pipe represented by node 520 at level 504. The decision to select the node 530 may be made by evaluating the number of the unavailable nodes that can be generated for each of the available nodes within the group from its respective block of codes. In other words, for each available node 530, 532 and 534 on level 506, the number of unavailable parent nodes is determined, and the node with the greatest number of unavailable parent nodes is selected for assignment to the second subscriber station. In this example, then, it is determined that the node 530 has 2 unavailable parent nodes (518 and 516); the node 532 has one unavailable parent node (516); and the node 534 has one unavailable parent node (516). The node 530, which has the highest number of unavailable nodes that can be generated from its respective block of Walsh codes 525, is therefore selected and assigned to the second subscriber station. Of course, it then follows that all nodes representing spreading sequences that can be generated from one or more of the Walsh codes from the block 525 should also then be flagged as virtually assigned.

Figure 6A:
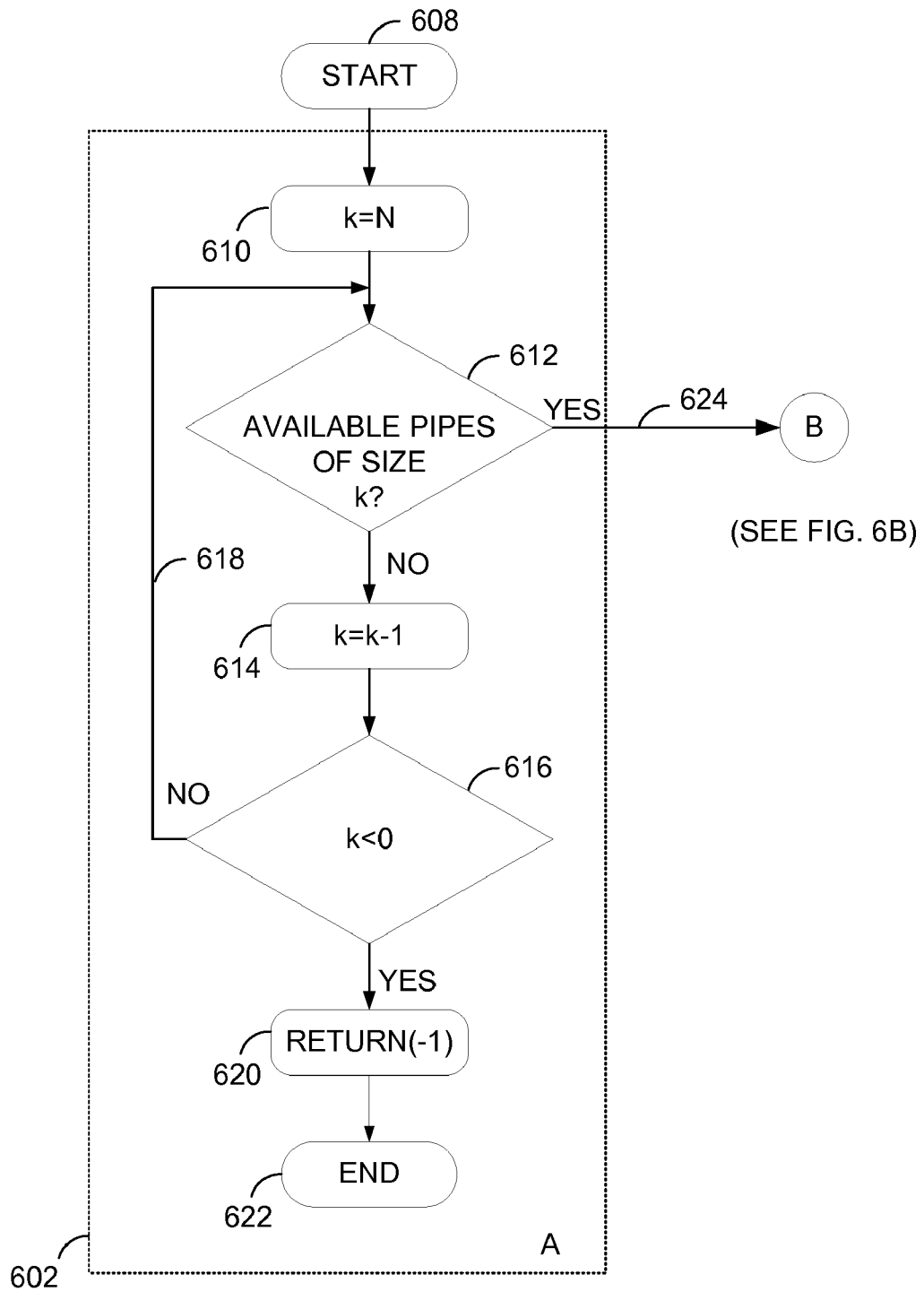
FIGS. 6A-6C are functional block diagrams of an algorithm for allocating spreading sequences to multiple users.
Figure 6B:
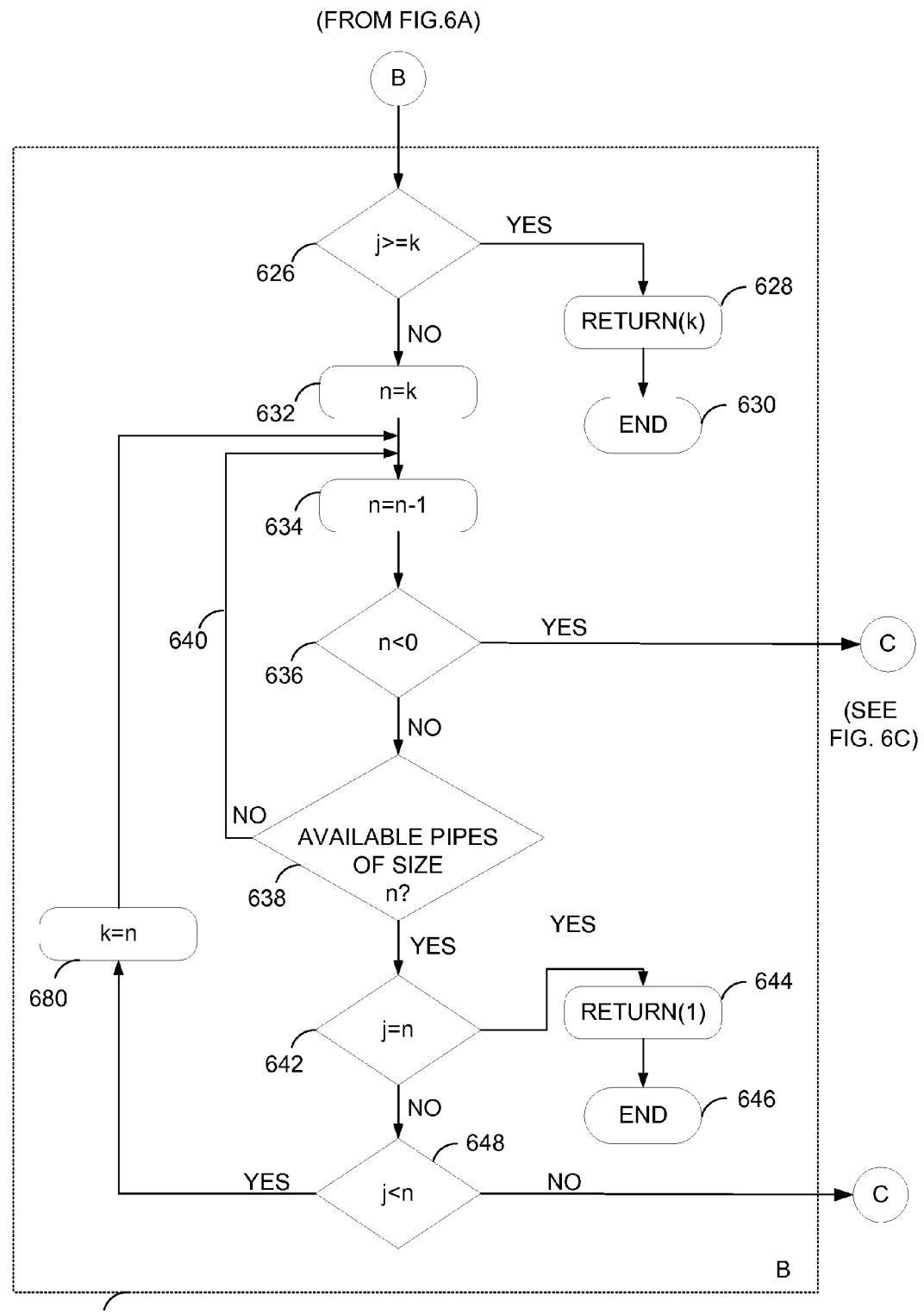
Figure 6C:
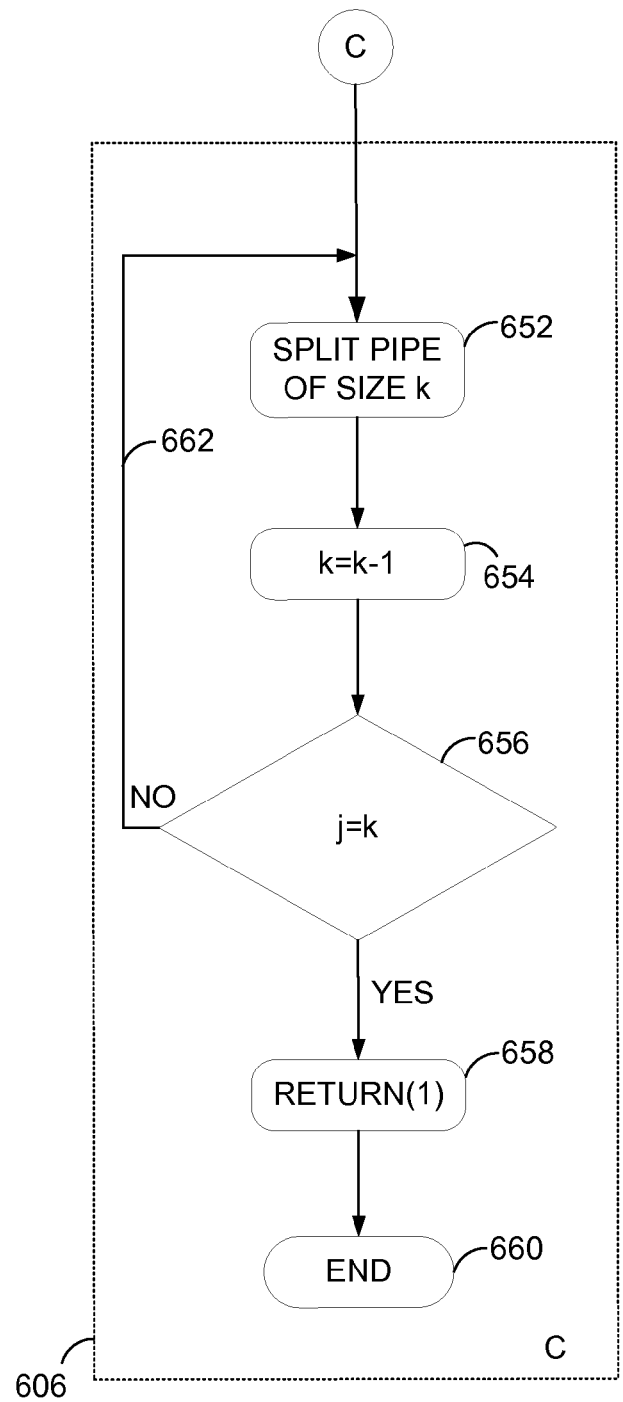

FIGS. 6A-6C are flow block diagrams illustrating an exemplary algorithm that may be used to implement the fundamental concepts described in connection with FIG. 5. As described above, the algorithm is employed to assign a pipe to support forward link communications from the base station to the subscriber station. The algorithm has three components. The first component 602, in FIG. 6A, identifies the highest capacity pipe available, which is used by the second component 604, in FIG. 6B, in a manner to be described in detail shortly. If the capacity of that pipe exceeds the capacity requirements of the subscriber station, the second component 604 searches for a pipe having a capacity commensurate with the capacity requirements of the subscriber station. If the second component search is successful, a pipe may be assigned to the subscriber station. Otherwise, a third component 606, in FIG. 6C, is used to search for a pipe having the requisite capacity using a split pipe operation.

The input to the algorithm, at block 608, is the pipe capacity "j" needed to support the forward link communications from the base station to the subscriber station. The algorithm is initialized by setting an index variable "k" to index "N" at block 610. Because this component of the algorithm is searching for the highest capacity pipe available, index N is the highest level of the Walsh code tree structure. For example, in a 64×64 Walsh code matrix, the tree structure has seven levels, and at the highest level N=6. At decision block 612, it is determined whether any pipes at the current level "k" are available. If a pipe at that level is available, then the algorithm enters component 604, described below. However, if no pipes are available at that level, the index variable is reduced to check for available pipes one level lower on the tree structure at block 614. Because "0" is the lowest level of the tree structure, the algorithm checks, at decision block 616, that the index variable does not fall below "0" as the iterative process of checking for an available pipe, represented by arrow 618, is repeated. If the iteration continues to the point where the index variable is reduced below "0," the algorithm determines that no pipes are available for assignment, and the process is terminated at block 622.

As described above, when the highest capacity pipe available is identified, as indicated at arrow 624, the algorithm enters component 604. It should be noted that when the highest capacity available pipe is identified, all pipes that can be created through one or more split pipe operations from the highest capacity pipe available are deemed unavailable whether previously assigned or not. Because it would be inefficient to assign a pipe with a higher capacity than needed, component 604 searches for a pipe having a capacity equal to "j." First, at decision block 626, it is determined whether the required pipe capacity "j" is greater than or equal to the index "k" of the highest capacity pipe available. If so, then at block 628, the algorithm selects the highest capacity pipe identified at component 602 to support the forward link transmission between the base station and the subscriber station, and the process terminates at block 630. Otherwise, an index variable "n" is initialized to the value of current index "k" at block 632, and the search for a lower capacity pipe is commenced. At block 634, index "n" is shifted down one level on the tree structure, and at decision block 636, it is checked whether the shifted index "n" has passed the "0"level of the tree structure. If so, then the search for a pipe having a capacity equal to "j" has failed, and the algorithm proceeds to component 606 for a split pipe operation. Otherwise, the algorithm determines at decision block 638 whether pipes at the shifted index "n" level are available. If pipes at that level are not available, the determination continues in an iterative fashion, as indicated by arrow 640, until an available lower capacity pipe is found. At that point, it is determined at decision block 642 whether the pipe at the shifted index "n" level is equal to the required pipe capacity "j." If so, then at block 644, that pipe is used to support the forward link transmission between the base station and the subscriber station. Otherwise, it is determined at decision block 648 whether the required pipe capacity "j" is smaller than the capacity of the pipe at the shifted index "n" level. If not, then the algorithm proceeds to component 606 for a split pipe operation. However, if the required pipe capacity "j" is determined to be lower than the capacity of the pipe at the shifted index "n" level, then index "k" is set to the current value of the shifted index "n" at block 680, and the iterative searching process begins again at block 632. In this manner, the search for a pipe having a capacity equal to "j" continues until a pipe is found or the required pipe capacity exceeds the capacity of the pipe at the shifted index "n" level.

In the event that the required pipe capacity "j" exceeds the capacity of the pipe at the shifted index "n" level, the algorithm enters component 606, where it performs a split pipe operation to create smaller pipes within the tree structure. At block 652, a split pipe operation is performed at the level represented by index "k." At block 654, index "k" is shifted down one level in the tree structure, and at decision block 656, the algorithm determines whether the required pipe capacity "j" is equal to the split pipe at the shifted index "k" level. If so, then one of the split pipes is assigned to the subscriber station at block 658, and the algorithm terminates at block 660. Otherwise, as indicated at arrow 662, the split pipe operation continues through the iterative process until a pipe having a capacity equal to "j" is found.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC. The ASIC may reside anywhere in the communications system. In the alternative, the processor and the storage medium may reside as discrete components anywhere in the communications system.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A spread-spectrum communications apparatus, comprising:
a scheduler configured to maintain a plurality of spreading sequence assignments and a plurality of available spreading sequences each being orthogonal to the assigned spreading sequences, the scheduler further being configured to select a spreading sequence from a group of the available spreading sequences having the same length, the selected spreading sequence being generated from a block of codes and being selected based on the number of the available spreading sequences that can be generated using the same block of codes, wherein each of the available spreading sequences in the group is generated from a different block of codes, and wherein the scheduler is further configured to select the spreading sequence having the lowest number of the available spreading sequences that can be generated using its respective block of codes.

2. The apparatus of claim 1 wherein the spreading sequence is selected by the scheduler to support transmissions over a communications channel, and wherein the scheduler is further configured to determine the group of the available spreading sequences by first determining a length based on the capacity of the communications channel and then assigning all the available spreading sequences having the length to the group.

3. The apparatus of claim 1 wherein the selected spreading sequence comprises a sequence common with a portion from each of the codes from the block.

4. The apparatus of claim 1 wherein the codes each comprises a Walsh code.

5. The apparatus of claim 1 wherein each of the available spreading sequences in the group is generated from a different block of codes, and wherein the scheduler is further configured to identify an available spreading sequence with the shortest length among all available spreading sequences, the selected spreading sequence being one of the spreading sequences from the group whose block of codes from which it is generated is not used to generate the identified spreading sequence.

6. The apparatus of claim 1 further comprising a selector element configured to spread communications intended for a wireless device with the selected spreading sequence.

7. A spread-spectrum communications apparatus, comprising:
a scheduler configured to maintain a plurality of spreading sequence assignments and a plurality of available spreading sequences each being orthogonal to the assigned spreading sequences, the scheduler further being configured to identify an available spreading sequence having the shortest length among all available spreading sequences, determine a target length and compare it to the length of the identified spreading sequence, and select an available spreading sequence based on the comparison, wherein the identified spreading sequence is generated from a block of codes, and if the target length is less than the length of the identified spreading sequence, the scheduler is further configured to remove from the available spreading sequences those spreading sequences that can be generated from at least one of the codes from the block, and select the spreading sequence from the remaining available spreading sequences if at least one of the remaining available spreading sequences has a length equal to the target length.

8. The apparatus of claim 7 wherein the selected spreading sequence comprises a length greater than or equal to the target length.

9. The apparatus of claim 7 wherein the scheduler is further configured to select the identified spreading sequence as the selected spreading sequence if the target length is greater than or equal to the length of the identified spreading sequence.

10. The apparatus of claim 7 wherein the identified spreading sequence is generated from a block of codes, and if the target length is less than the length of the identified spreading sequence, the scheduler is further configured to remove from the available spreading sequences those spreading sequences that can be generated from at least one of the codes from the block, and select one of the removed spreading sequences if none of the remaining available spreading sequences have a length equal to the target length.

11. The apparatus of claim 7 wherein the spreading sequence is selected by the scheduler to support transmissions over a communications channel, and wherein the scheduler is further configured to determine the target length by measuring the capacity of the communications channel.

12. A spread-spectrum communications apparatus, comprising:
  means for maintaining a plurality of spreading sequence assignments and a plurality of available spreading sequences each being orthogonal to the assigned spreading sequences; and
  selection means for selecting a spreading sequence from a group of the available spreading sequences having the same length, the selected spreading sequence being generated from a block of codes and being selected based on the number of the available spreading sequences that can be generated using the same block of codes, wherein each of the available spreading sequences in the group is generated from a different block of codes, and wherein the selection means selects the spreading sequence having the lowest number of the available spreading sequences that can be generated using its respective block of codes.

13. The apparatus of claim 12 wherein the spreading sequence is selected to support transmissions over a communications channel, the apparatus further comprising means for determining the group of the available spreading sequences by first determining a length based on the capacity of the communications channel and then assigning all the available spreading sequences having the length to the group.

14. The apparatus of claim 12 wherein the selected spreading sequence comprises a sequence common with a portion from each of the codes from the block.

15. The apparatus of claim 12 wherein the codes each comprises a Walsh code.

16. The apparatus of claim 14 wherein each of the available spreading sequences in the group is generated from a different block of codes, the apparatus further comprising means for identifying an available spreading sequence with the shortest length among all available spreading sequences, the selected spreading sequence being one of the spreading sequences from the group whose block of codes from which it is generated is not used to generate the identified spreading sequence.

17. The apparatus of claim 12 further comprising means for spreading communications with the selected spreading sequence.

18. A method of spread-spectrum communications, comprising:
  maintaining a plurality of spreading sequence assignments and a plurality of available spreading sequences each being orthogonal to the assigned spreading sequences; and
  selecting a spreading sequence from a group of the available spreading sequences having the same length, the selected spreading sequence being generated from a block of codes and being selected based on the number of the available spreading sequences that can be generated using the same block of codes, wherein each of the available spreading sequences in the group is generated from a different block of codes, and wherein a scheduler is further configured to select the spreading sequence having the lowest number of the available spreading sequences that can be generated using its respective block of codes.

* * * * *